(12) United States Patent
Thornton

(10) Patent No.: US 7,339,591 B2
(45) Date of Patent: Mar. 4, 2008

(54) METHOD TO MANAGE GRAPHICS ADDRESS REMAP TABLE (GART) TRANSLATIONS IN A SECURE SYSTEM

(75) Inventor: Andrew Thornton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 11/076,654

(22) Filed: Mar. 10, 2005

(65) Prior Publication Data

US 2006/0202999 A1 Sep. 14, 2006

(51) Int. Cl.
*G06T 15/00* (2006.01)
(52) U.S. Cl. .................... 345/531; 345/564; 711/202; 711/203
(58) Field of Classification Search ................ 345/531, 345/564–568; 711/202–207
See application file for complete search history.

(56) References Cited

U.S. PATENT DOCUMENTS

| | | | | |
|---|---|---|---|---|
| 6,457,068 B1 * | 9/2002 | Nayyar et al. | ................. | 710/3 |
| 6,748,512 B2 * | 6/2004 | Buch et al. | ................. | 711/202 |
| 7,009,618 B1 * | 3/2006 | Brunner et al. | ............ | 345/566 |
| 7,139,890 B2 * | 11/2006 | Moran et al. | ............... | 711/163 |

* cited by examiner

*Primary Examiner*—Phu K. Nguyen
(74) *Attorney, Agent, or Firm*—Woodcock Washburn LLP

(57) ABSTRACT intercepted in order to determine if the modification will result in an aperture memory address mapping to a region of trusted memory. If it is determined that the GART modification will not result in a mapping to a portion of trusted memory, then the GART modification is allowed. If it is determined that the GART modification will result in a mapping to a portion of trusted memory, then the modification is not allowed and an alarm is raised in the system.

18 Claims, 5 Drawing Sheets

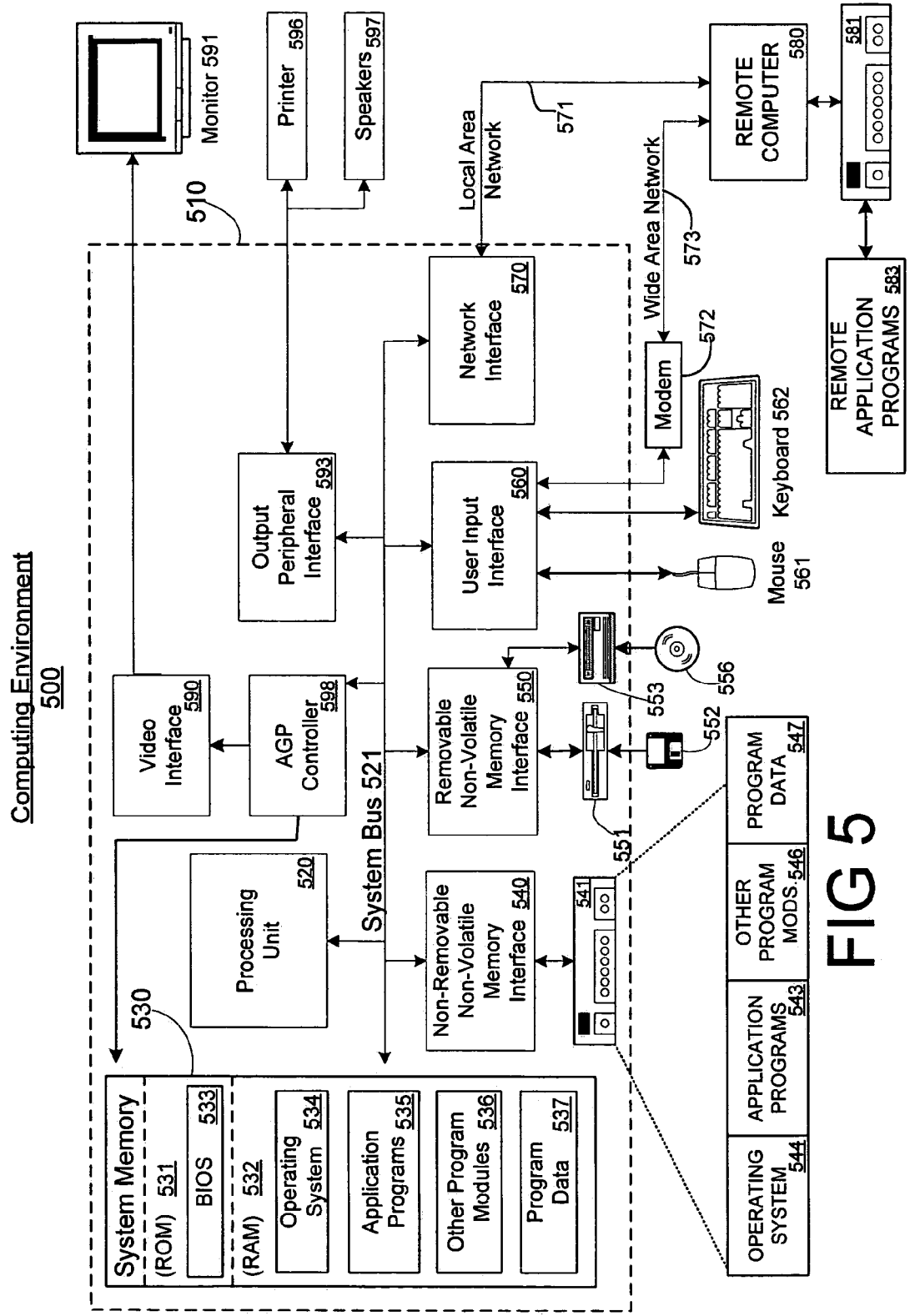

METHOD TO MANAGE GRAPHICS ADDRESS REMAP TABLE (GART) TRANSLATIONS IN A SECURE SYSTEM

FIELD OF THE INVENTION

This invention relates to the field of trusted systems. More specifically, this invention relates to eliminating vulnerabilities in the graphics address remap table.

BACKGROUND OF THE INVENTION

An accelerated graphics port ("AGP") is a high-speed point-to-point channel for attaching a single device (generally a graphics card) to a computer's motherboard, primarily to assist in the acceleration of 3D computer graphics. The AGP allows system software to dynamically allocate disjoint pages of the PC's system RAM 110 for use by the graphics card to store a frame buffer and to support texture mapping, z-buffering and alpha blending, for example. As shown, system RAM 110 comprises memory pages 111-120.

The physical addresses employed by the graphics controller to access these textures is typically above the top of the system RAM 110 and is referred to as the GART Aperture 150. The top of the system RAM 110 is indicated at dotted line 170. However, these aperture addresses are remapped, meaning that the physical memory corresponding to this address space does not actually exist above the top of system RAM 110. These aperture addresses correspond to physical memory pages 151-154. In reality, accesses to each of these aperture addresses is remapped to a corresponding physical address in system RAM 110. The graphics controller sees this aperture address space as one contiguous block of memory, but the corresponding physical memory pages may be allocated from non-contiguous pages anywhere in system RAM 110. The mapping of aperture addresses to the corresponding system RAM 110 addresses is located in a graphics address remap table ("GART") 180, stored at memory page 115, for example.

The system RAM 110 comprises a plurality of potentially non-contiguous memory pages. As described above, the AGP graphics card requires a contiguous block of memory to operate. Through normal system operation, the system RAM 110 can become very fragmented, making allocating a contiguous block of memory to the graphics card impossible. Accordingly, the GART 180 provides a remapping of aperture memory addresses to the available physical memory addresses in the system RAM 110. For example, as shown in the GART 180, aperture page 151 is mapped to system RAM 110 page 116, aperture page 152 is mapped to system RAM 110 page 119, and aperture page 153 is mapped to system RAM 110 page 113. When software or hardware attempts to access aperture memory page 152, for example, the GART 180 is typically referenced to determine the corresponding system RAM 110 address. Accordingly, the access is redirected to physical memory page 119.

While the use of the GART 180 allows non-contiguous system RAM 110 to appear to the graphics card as a block of contiguous address space, there are security risks associated with the GART 180. Trusted systems typically operate by partitioning the physical pages of system RAM 110 into trusted and non-trusted portions (not shown). Only trusted systems are allowed access to the trusted portions of memory, providing security against a malicious program or application from reading from or writing to the trusted portions of memory.

Because the GART 180 provides a mapping from aperture memory addresses to system RAM 110 memory addresses, and both exist within the same physical address space, a system RAM page can be accessed by more than one physical address. Thus, it can be difficult to determine if a particular aperture memory address refers to a trusted portion of memory. In addition, both trusted and non-trusted applications may have access to the GART 180. A malicious application could therefore alter, or overwrite, the GART 180 such that a particular untrusted aperture memory address points to a page of trusted memory. In this way, a malicious application could then read from and write to the trusted portions of memory by going through the GART 180

Therefore what is needed are systems and methods to prevent applications from adding trusted memory addresses to the GART.

SUMMARY OF THE INVENTION

A attempt is made to modify the GART. The write to the GART is intercepted in order to determine if the modification will result in an aperture memory address mapping to a region of trusted memory. The attempt to modify the GART is analyzed using a table which is digitally signed by the GART manufacturer and associated with the particular GART implementation used in the system. If it is determined that the GART modification will not result in a mapping to a portion of trusted memory, then the GART modification is allowed. If it is determined that the GART modification will result in a modification to the trusted memory, then the modification is not allowed and an alarm is raised in the system.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 5 is a block diagram showing an exemplary computing environment in which aspects of the invention may be implemented.

DETAILED DESCRIPTION OF ILLUSTRATIVE EMBODIMENTS

Figure 2:
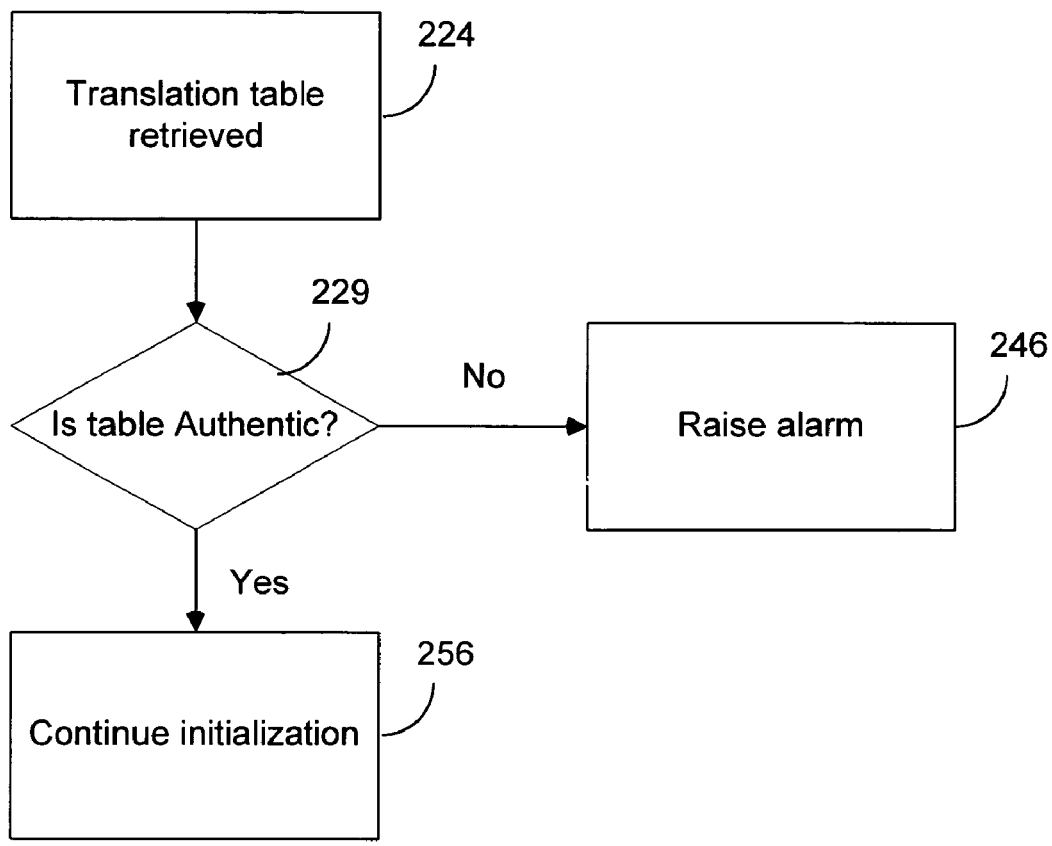
FIG. 2 is a flow diagram illustrating an exemplary method for authenticating a GART translation table in accordance with the present invention.

FIG. 2 is a flow diagram illustrating an exemplary method for authenticating a GART translation table in accordance with the present invention. During system initialization the GART translation table is retrieved. The GART translation table is authenticated to determine if it may have been tampered with. If the translation table cannot be authenticated then an alarm is sounded. Else, the system is permitted to operate.

At 224, the system begins initialization, and a translation table corresponding to the particular GART implementation utilized in the system is desirably retrieved. While the use of a GART is common to many implementations of the AGP bus, each manufacturer of systems using the AGP bus may have a separate specification regarding the layout and implementation of the GART. Because the GART specification may differ from system to system, a key or translation table associated with the particular GART implementation used in the system is desirably available during the initialization. The translation table is desirably made available at a fixed memory address or location, for example. Any system, method, or technique known in the art for storing or retrieving translation tables may be used.

At 229, the translation table is desirably authenticated. To prevent a malicious application from modifying the translation table to hide or prevent the detection of the GART modification to point to trusted memory, the translation table is desirably digitally signed by the manufacturer of the GART implementation. Digital signatures allow the authentication of a file through the use of public key encryption, for example. Any system, method or technique known in the art to verify the source or authenticity of a file may be used. If the translation table is successfully authenticated then the system resumes initialization at 256. Else, an alarm is desirably raised at 246.

At 246, the partitioning kernel has determined that the translation table cannot be authenticated. Accordingly, the partitioning kernel desirably sounds an alarm, or otherwise indicates that there is a compromise to the trusted memory system. Depending on the security level associated with the trusted computer system, a variety of actions can take place. For example, in a highly secure system, such as a government computer, the system may halt the initialization process and otherwise shut down the computer. In a system with low security a warning may be displayed indicating that the GART translation table could not be authenticated and ask if the user wishes to proceed with initialization, for example. The user may then either allow or deny the further initialization. Any system, method or techniques known in the art for alerting a user to a security breach may be used.

Figure 3:
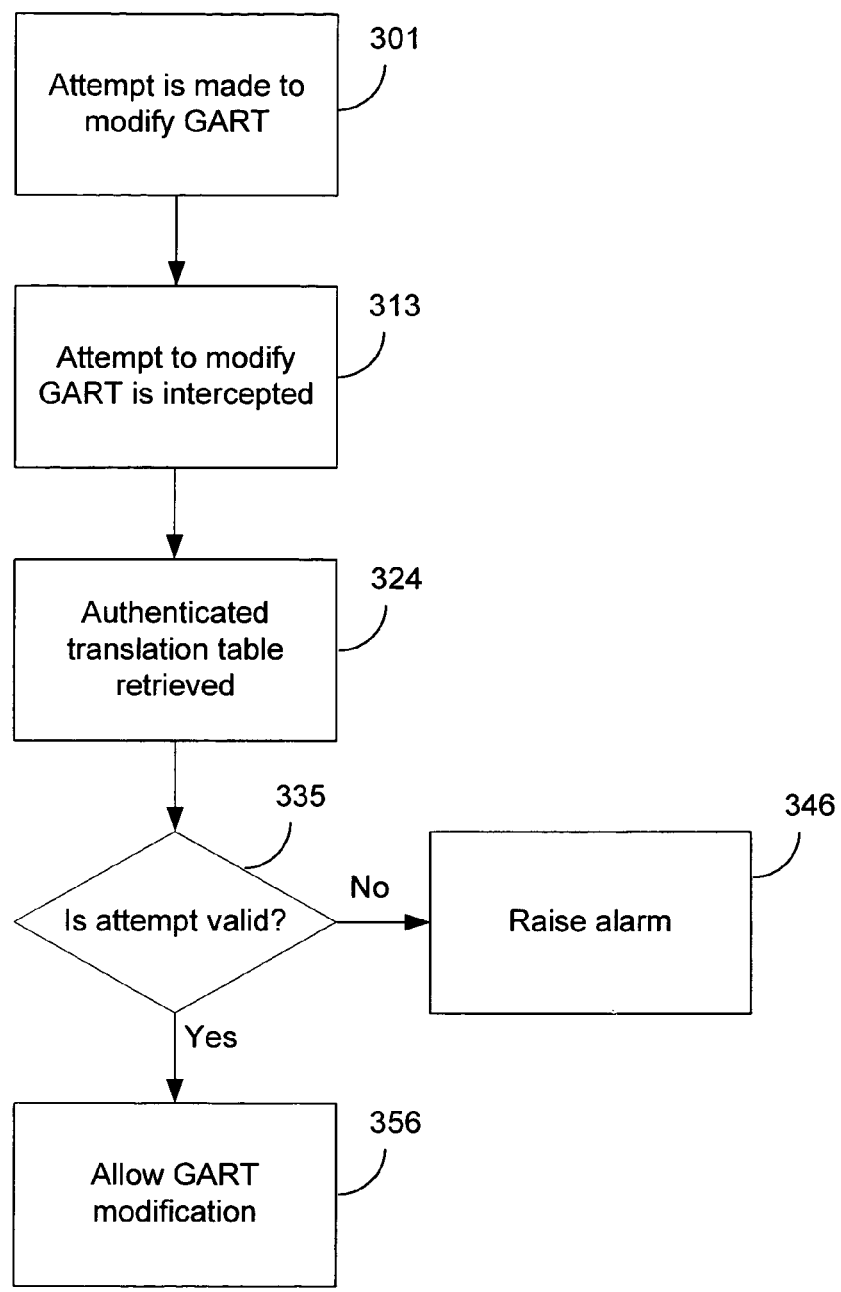
FIG. 3 is a flow diagram illustrating an exemplary method for managing GART translations in accordance with the present invention.

FIG. 3 is a flow diagram illustrating an exemplary method for managing GART translations in accordance with the present invention. A attempt is made to modify the GART. The attempt is intercepted in order to determine if the modification will result in an aperture memory address mapping to a region of trusted memory. If it is determined that the GART modification will not result in a mapping to a portion of trusted memory, then the GART modification is allowed. If it is determined that the GART modification will result in a mapping to the trusted memory, then the modification is not allowed and an alarm is raised in the system.

Figure 1:
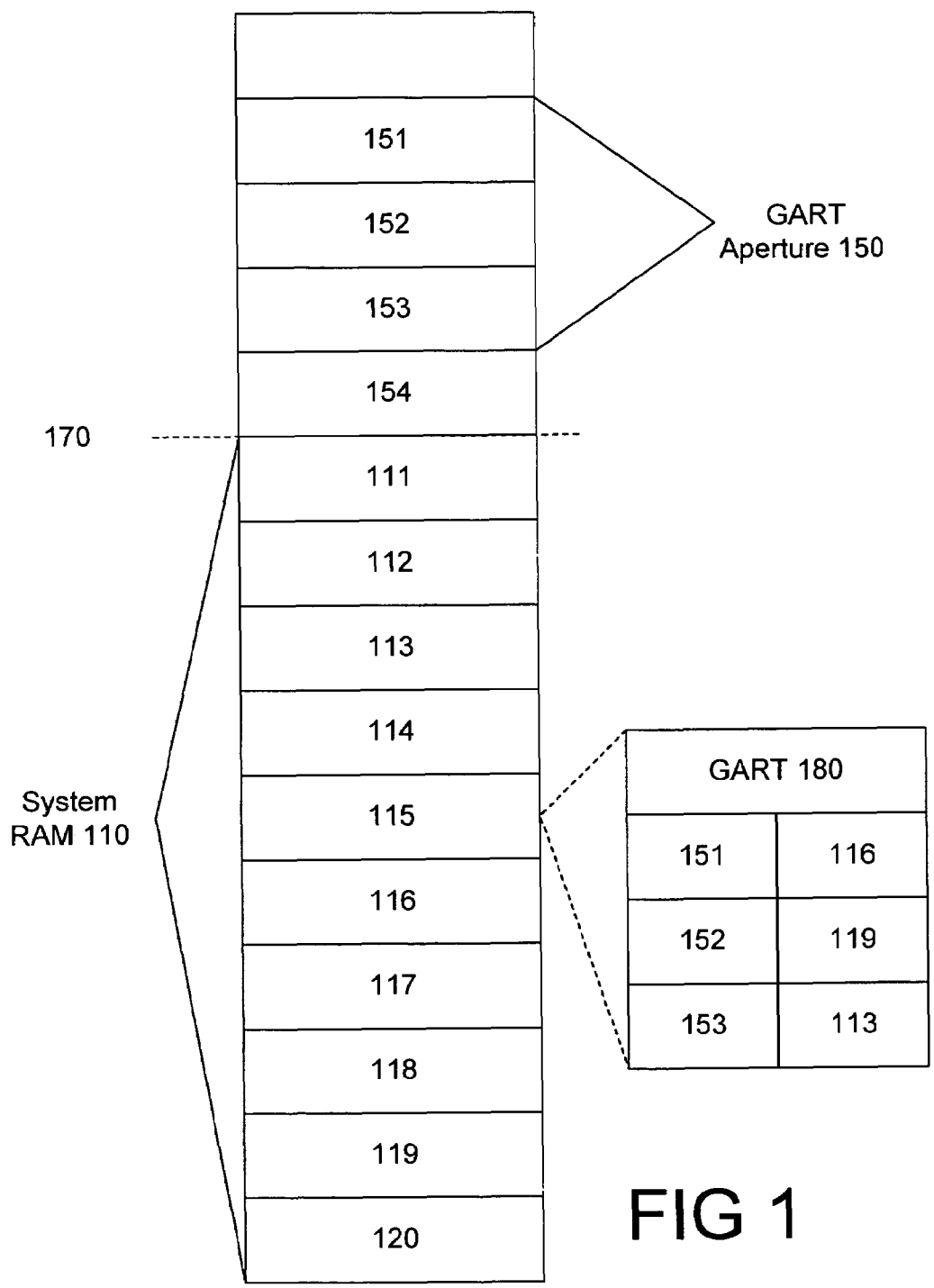
FIG. 1 is a block diagram illustrating an exemplary computer system capable of implementing an exemplary method for managing GART translations accordance with the present invention.

At 301, an attempt is desirably made to modify the GART. The attempt may be made by an application or process, for example. As described previously, the GART is a table that provides a mapping of physically contiguous aperture memory addresses to non-contiguous system RAM 110 addresses in a computer system, as shown in FIG. 1 for example. The GART is desirably used to provide the illusion of contiguous memory space to devices operating on the AGP bus. In a trusted system, memory space is often divided into trusted and non-trusted portions. The addresses corresponding to the trusted memory space are desirably monitored to prevent a non-trusted application from writing to or reading from these addresses. In this way, a trusted application can be assured that its memory space has not been compromised by a non-trusted application. However, the GART provides a mapping of aperture memory addresses to system RAM 110 addresses. Because any given memory location may now have two or more physical addresses, a number of aperture addresses as well as a system RAM 110 address, it can be difficult for the system to maintain the security of the trusted address space. Because a malicious application may modify the GART to point to trusted memory, any attempts to modify the GART are desirably treated suspiciously.

At 313, the attempt to modify the GART is desirably intercepted. The request may be intercepted by a partitioning kernel, for example. The partitioning kernel is a very low level process operating in the background of the computer system. It divides the computer system into a number of independent isolated partitions each of which is a full computing environment capable of running an operating system. The request may be intercepted using any system, method, or technique known the art for monitoring and intercepting memory accesses.

At 324, the authenticated GART translation table is desirably retrieved. As described with respect to FIG. 2, the GART translation table was previously authenticated during an initialization sequence. Therefore, the GART translation table can be trusted as authentic. Any system, method, or technique known in the art for retrieving the authenticated GART translation table can be used.

At 335, the partitioning kernel desirably determines if the attempt to modify the GART is a valid attempt. The partitioning kernel desirably determines if the attempt is valid by translating the attempted modification using the authenticated translation table. As described previously, each GART implementation may be different, resulting in a variety of GART formats. Therefore, in order to determine which fields in the GART correspond to the memory addresses, or other relevant fields, the translation table is desirably referenced. After determining what result the attempted modification will have on the GART, including what memory addresses are involved, the partitioning kernel desirably compares the memory addresses against a list of trusted memory addresses. If the attempt is determined not to involve trusted memory addresses the partitioning kernel desirably allows the modification at 356. Else, the partitioning kernel desirably continues at 346.

At 346, the partitioning kernel has determined that the attempt to modify the GART is invalid. Accordingly, the partitioning kernel desirably sounds an alarm, or otherwise indicates that there is a compromise to the trusted memory system. Depending on the security level associated with the trusted computer system, a variety of actions can take place. For example, in a highly secure system, such as a government computer, the system may shut down to prevent any further damage. In a system with low security a warning may be displayed indicating that an application is attempting to modify the GART to point to trusted memory, for example. The user may then either allow or deny the modification. Any system, method or techniques known in the art for alerting a user to a security breach may be used.

Figure 4:
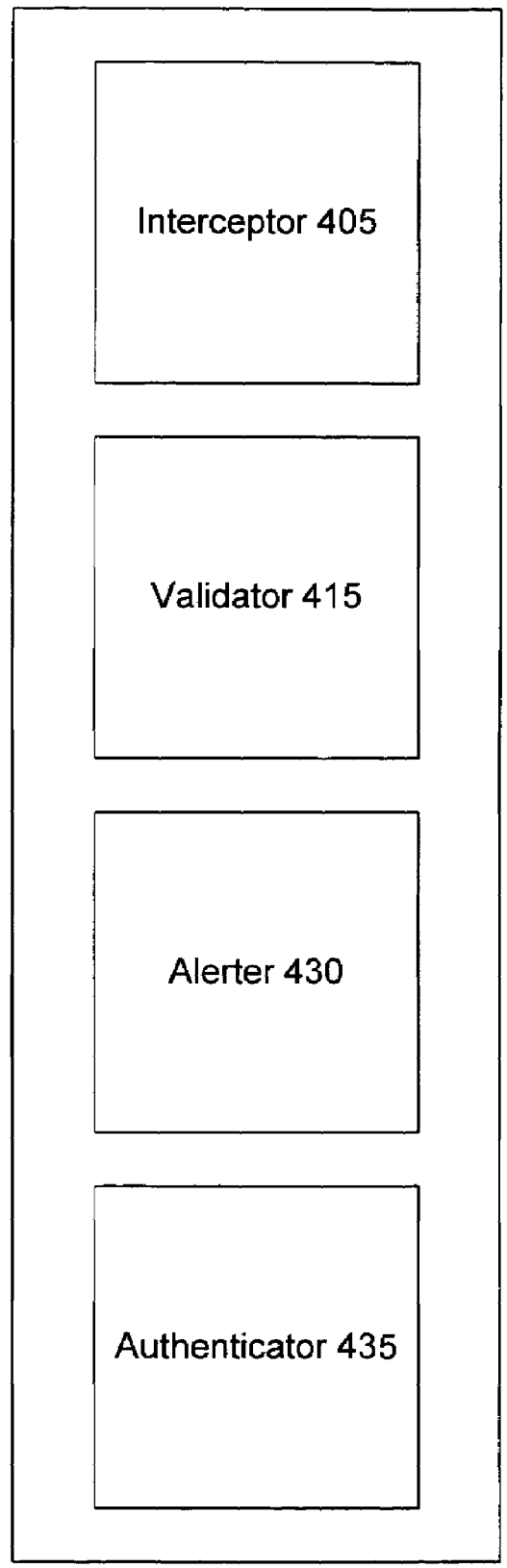
FIG. 4 is a block diagram illustrating an exemplary system for managing GART translations in accordance with the present invention.

FIG. 4 is a block diagram illustrating an exemplary system for managing GART translations in accordance with the present invention. The system includes several means for performing functions. These means include an interceptor 405, a validator 415, an alerter 430, and an authenticator 435.

The interceptor 405 intercepts GART accesses in a computer system. As described previously, the computer system desirably comprises an AGP bus. A benefit of AGP is that it allows devices plugged into the bus to share system memory with the computer system. System memory is typically allocated non-contiguously. However, graphics cards or other devices typically need to access memory in contiguous blocks. Accordingly, a GART is used to remap contiguous aperture memory addresses to the non-contiguous system RAM 110 addresses. Memory accesses to aperture addresses from the AGP device are translated through the GART to get the corresponding system RAM 110 memory address.

Because aperture memory addresses in the GART can be potentially remapped to trusted system RAM 110 pages, it is desirable that any attempts to modify the GART are intercepted to determine if the modification will result in a mapping of an aperture memory address to a trusted physical memory address. Accordingly, the interceptor 405 intercepts, or otherwise receives all attempts to modify the GART. The inceptor 405 may monitor the physical memory address associated with the GART, and intercept any attempted writes to the associated memory address, for example. The interceptor 405 is desirably part of a low level process, such as a partitioning kernel, for example. The interceptor 405 can be any implemented using any suitable system, method or technique known in the art for monitoring and intercepting memory accesses.

The validator 415 determines if a requested GART modification will result in a mapping of an aperature memory address to a portion of trusted memory. As described previously, the particular implementation of GART may vary from manufacturer to manufacturer making it difficult to determine if the modification is valid or not. Accordingly, there may exist a translation table corresponding to the particular implementation of GART used by the system. This table may be stored at a known location in the system such that the validator 415 need not know what implementation of GART is being used, rather at what location to look for the table. The validator 415 desirably verifies that the intercepted GART modification attempt will not result in a mapping of an aperture memory address to a trusted memory address by translating the GART modification request using the translation table and comparing the modified GART entry to the list of trusted memory addresses as well as the memory location of the GART itself. If the modification does not result in a mapping to a trusted memory location or memory location of the GART, then the validator 415 desirably allows the GART modification. Else, the validator 415 desirably instructs the alerter 430 to raise an alarm. The validator 415 can be any implemented using any suitable system, method or technique known in the art for validating GART modifications.

The alerter 430 raises an alarm if it is determined that there has been an attempt to modify the GART to point to a trusted portion of memory. In addition, the alerter 430 may be used to raise an alarm if the GART translation table cannot be verified as authentic by the authenticator 435, for example. The alerter 430 desirably raises an alarm corresponding to the security specified by a user or administrator of the trusted system. For example, in a highly secured environment the alerter 430 may have been instructed to shut down, or reboot, the system. In another system, the alerter 430 may simply shut down the requesting application or process. In yet another system, the alerter 430 may prompt the user to see if they wish to proceed. The alerter 430 can be any implemented using any suitable system, method or technique known in the art for raising an alarm in a computer system.

The authenticator 435 authenticates the GART translation table. To avoid the possibility of a malicious application substituting its own GART translation table, the GART translation table is desirably digitally signed to prevent such a substitution. During system initialization, the authenticator 435 may retrieve the GART translation table and determine if it is authentic using the described digital signature. If the GART translation table cannot be authenticated then the authenticator 435 may request that the alerter 430 raise an alarm, for example. Once the authenticator 435 authenticates the GART translation table, then the system completes the initialization process and GART modification attempts may be intercepted by the interceptor 405.

Exemplary Computing Environment

FIG. 5 illustrates an example of a suitable computing system environment 500 in which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer readable media. Computer readable media can be any available media that can be accessed by computer 510 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or non-volatile memory such as ROM 531 and RAM 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/non-volatile computer storage media. By way of example only, FIG. 5 illustrates a hard disk drive 540 that reads from or writes to non-removable, non-volatile magnetic media, a magnetic disk drive 551 that reads from or writes to a removable, non-volatile magnetic disk 552, and an optical disk drive 553 that reads from or writes to a removable, non-volatile optical disk 556, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 553 are typically connected to the system bus 521 by a removable memory interface, such as interface 550.

The drives and their associated computer storage media provide storage of computer readable instructions, data structures, program modules and other data for the computer 510. In FIG. 5, for example, hard disk drive 541 is illustrated as storing operating system 544, application programs 543, other program modules 546, and program data 547. Note that these components can either be the same as or different from operating system 534, application programs 535, other program modules 536, and program data 537. Operating system 544, application programs 543, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via AGP controller 598 and video interface 590. In addition to the monitor, computers may also include other peripheral output devices such as speakers 597 and printer 596, which may be connected through an output peripheral interface 593.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted include a LAN 571 and a WAN 573, but may also include other networks. Such networking environments are commonplace in offices, enterprise-wide computer networks, intranets and the internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 583 as residing on memory device 581. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/ or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLOD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method for modifying a graphics address remap table (GART) in a computer system, comprising:
    intercepting an instruction to perform a modification on the GART, wherein the GART comprises a mapping of aperture memory addresses to physical memory addresses in system RAM;
    determining if the modification will result in a mapping of an aperture memory address to a physical memory address associated with trusted memory; and
    preventing the modification and raising an alarm if it is determined that the modification will result in a mapping of an aperture memory address to a physical memory address associated with trusted memory.

2. The method of claim 1, wherein raising an alarm comprises shutting down the computer system.

3. The method of claim 1, further comprising allowing the modification if it is determined that the modification will not result in a mapping of an aperture memory address to a physical memory address associated with trusted memory.

4. The method of claim 1, further comprising:
    retrieving a table describing the format of the GART; and
    retrieving a list of trusted memory addresses.

5. The method of claim 4, wherein determining if the modification will result in a mapping of an aperture memory to a physical memory address associated with trusted memory comprises:
    using the table describing the format of the GART to determine which physical memory address, if any, aperture memory addresses will map to after the modification; and
    determining that the modification will result in a mapping of an aperture memory address to a physical memory address associated with trusted memory if the determined physical memory address is on the list of trusted memory addresses.

6. The method of claim 4, wherein the table is digitally signed.

7. The method of claim 6, further comprising authenticating the table using the digital signature and raising an alarm if the table is not authentic.

8. The method of claim 1, wherein the GART is stored at a physical memory address.

9. The method of claim 8, further comprising:
    determining if the modification will result in a mapping of an aperture memory address to the physical memory address where the GART is stored; and
    raising an alarm if it is determined that the modification will result in a mapping of an aperture memory address to the physical memory address where the GART is stored.

10. A computer-readable medium implemented at least in part by a computer with computer-executable instructions stored thereon for performing the method of:
    intercepting an instruction to modify a graphics address remap table (GART), wherein the GART comprises a mapping of aperture addresses to physical memory addresses in a computer system;
    determining if the modification will result in a mapping of an aperture memory address to a physical memory address associated with trusted memory; and
    preventing the modification and raising an alarm if it is determined that the modification will result in a mapping of an aperture memory address to a physical memory address associated with trusted memory.

11. The computer-readable medium of claim 10, wherein raising an alarm comprises shutting down the computer system.

12. The computer-readable medium of claim 10, further comprising computer-executable instructions for allowing the modification if it is determined that the modification will not result in a mapping of an aperture memory address to a physical memory address associated with trusted memory.

13. The computer-readable medium of claim 10, further comprising computer-executable instructions for:
    retrieving a table describing the format of the GART; and
    retrieving a list of trusted memory addresses.

14. The computer-readable medium of claim 13, wherein determining if the modification will result in a mapping of an aperture memory address to a physical memory address associated with trusted memory comprises computer-executable instructions for:
    using the file describing the format of the GART to determine which physical memory address, if any, aperture memory addresses will map to after the modification; and
    determining that the modification will result in a mapping of an aperture memory address to a physical memory address associated with trusted memory if the determined physical memory address is on the list of trusted memory addresses.

15. The computer-readable medium of claim 13, wherein the table is digitally signed.

16. The computer-readable medium of claim 15, further comprising computer-executable instructions for authenticating the file using the digital signature and raising an alarm if the table is not authentic.

17. A system for preventing modifications to a GART, comprising:
- means for intercepting an attempt to modify the GART;
- means for validating that the requested modification to the GART will not result in a mapping of an aperture memory address to a physical memory address corresponding to a portion of trusted memory; and
- means for raising an alarm if the requested modification cannot be validated.

18. The system of claim 17, wherein the means for validating further comprises:
- means for retrieving a file describing the structure of the GART;
- means for authenticating the file describing the structure of the GART; and
- means for determining if the modification with result in a mapping of an aperture memory address to corresponding to a portion of trusted memory using the file describing the structure of the GART and a list of trusted memory addresses.

* * * * *